(12) United States Patent
Liang (10) Patent No.: US 7,958,264 B2
(45) Date of Patent: *Jun. 7, 2011

(54) URI POINTER SYSTEM AND METHOD FOR THE BROADCAST OF MPEG-4 DATA IN AN ATSC MPEG-2 TRANSPORT STREAM FILE SYSTEM

(75) Inventor: Kai-Chieh Liang, Huntington Beach, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 381 days.

This patent is subject to a terminal disclaimer.

(21) Appl. No.: 12/181,985

(22) Filed: Jul. 29, 2008

(65) Prior Publication Data

US 2008/0279273 A1 Nov. 13, 2008

Related U.S. Application Data

(60) Division of application No. 10/680,694, filed on Oct. 7, 2003, now Pat. No. 7,421,513, which is a continuation-in-part of application No. 10/670,949, filed on Sep. 25, 2003.

(51) Int. Cl.
*G06F 15/16* (2006.01)
(52) U.S. Cl. .................. 709/245; 709/231; 725/112
(58) Field of Classification Search .................. 709/245, 709/231, 218–219; 725/112, 131
See application file for complete search history.

(56) References Cited

U.S. PATENT DOCUMENTS

| 6,092,107 | A * | 7/2000 | Eleftheriadis et al. ........ 709/217 |
| 6,801,575 | B1 * | 10/2004 | Crinon ..................... 375/240.26 |
| 2002/0124263 | A1 * | 9/2002 | Yokomizo .................... 725/112 |
| 2004/0031058 | A1 * | 2/2004 | Reisman ...................... 725/112 |
| 2005/0081143 | A1 * | 4/2005 | Liang ........................... 715/513 |
| 2008/0279273 | A1 * | 11/2008 | Liang ....................... 375/240.01 |

FOREIGN PATENT DOCUMENTS

EP 1045564 A1 * 10/2000

OTHER PUBLICATIONS

Herpel, "Elementary Stream Management in MPEG-4", IEEE, Mar. 1999.*

* cited by examiner

*Primary Examiner* — Philip B Tran
(74) *Attorney, Agent, or Firm* — Law Office of Gerald Maliszewski; Gerald Maliszewski

(57) ABSTRACT

A URI pointer system and method are provided for the referencing of MPEG-4 data resources carried in an American ATSC MPEG-2 TSFS. The method comprises: receiving an MPEG-2 TS, with a packetized ATSC TSFS; locating a URI in the TS; in response to the URI, accessing an address such as a lid or an http address; retrieving MPEG-4 resources from the ATSC TSFS; and, decoding the MPEG-4 resources. Accessed lid URIs provide a binding name and access scheme to the objects in the ATSC TSFS, as a lid URI embedded in an Initial Object Descriptor (IOD) is used to locate resources in the TSFS such as a BIFS scene description stream and/or an object descriptor stream. Receiving an MPEG-2 TS, with a packetized ATSC TSFS, means that MPEG-4 resources are formed in a hierarchical directory structure of BIOP objects including a DSM::ServiceGateway, a DSM::Directory, and a DSM::File.

15 Claims, 6 Drawing Sheets

URI POINTER SYSTEM AND METHOD FOR THE BROADCAST OF MPEG-4 DATA IN AN ATSC MPEG-2 TRANSPORT STREAM FILE SYSTEM

RELATED APPLICATIONS

This application is a Divisional of a application entitled, URI POINTER SYSTEM AND METHOD FOR THE CARRIAGE OF MPEG-4 DATA IN AN ATSC MPEG-2 TRANSPORT STREAM FILE SYSTEM, invented by Kai-Chieh Liang, U.S. Ser. No. 10/680,694, filed on Oct. 7, 2003, now U.S. Pat. No. 7,421,513;

which is a continuation-in-part of a pending application entitled, URI POINTER SYSTEM AND METHOD FOR THE CARRIAGE OF MPEG-4 DATA IN AN MPEG-2 TRANSPORT STREAM, invented by Kai-Chieh Liang, Ser. No. 10/670,949, filed Sep. 25, 2003. Both of the above mentioned applications are incorporated herein by reference.

BACKGROUND OF THE INVENTION

1. Field of the Invention

This invention generally relates to digital image and data transport processes and, more particularly, to a uniform resource indicator (URI) system and method for carrying MPEG-4 data in an American Advanced Television Systems Committee (ATSC) transport stream file system (TSFS) packetized in an MPEG-2 transport stream (TS).

2. Description of the Related Art

Most of the digital video broadcasting systems, such as European Digital Video Broadcasting (DVB) and American Advanced Television Systems. Committee (ATSC), are based on the common MPEG-2 coding systems. MPEG-2 offers features such as high-definition video, multiple-channel audio, and even the exciting new multimedia data and interactive services.

Meanwhile, ISO and IEC have jointly developed ISO/IEC 14496 MPEG-4 as the next generation audiovisual standard. MPEG-4 provides better compression efficiency than MPEG-2 and new features such as audiovisual interactivities, Copyright Protection, and other features that can enhance digital television broadcasting and enable new applications. The harmonization between MPEG-2 based broadcasting standards, such as DVB, and MPEG-4 technologies is important for the enhancement of future digital television broadcasting. The harmonization of the MPEG-2 broadcasting and MPEG-4 standards must include the harmonization of layers, such as transport layer and application layer.

Transport layer harmonization is the foundation of this effort. Specifically, a means must be found to enable the carriage of MPEG-4 data elements, including scenes and associated streams, by the MPEG-2 broadcasting specified transport layer protocols. The MPEG-2 broadcasting system, such as Europe DVB or American ATSC, has defined transport protocols including MPEG-2 Transport Stream, DSM-CC Data Carousel, DSM-CC User-to-User (U-U) Object Carousel, and Internet Protocol, to name a few. MPEG-2 Transport Stream is the foundation layer for most of the other protocols. Thus, carriage of MPEG-4 data using MPEG-2 transport is an important issue to solve.

ISO/IEC has specified the method for carriage of MPEG-4 content on MPEG-2 transport stream (known as 4on2) in the specification of ISO/IEC 13818-1. MPEG-4 contents consist of an initial object descriptor and a variable number of streams, such as object descriptor stream, scene description streams, audio streams, video streams, and IPMP streams. The specification (ISO/IEC 13818-1) requires that each of the MPEG-4 streams be contained in an SL-packetized stream and may optionally be multiplexed into a FlexMux stream, both defined in ISO/IEC 14496-1. The SL-packetized streams or FlexMux streams are then encapsulated either in MPEG-2 Packetized Elementary Stream (PES) packets or in ISO_IEC_14496_sections prior to Transport Stream packetization and multiplexing.

ISO/IEC 13818-1 specifies the encapsulation and signaling approaches for the ISO/IEC 14496 audiovisual scenes and associated streams carried in ISO/IEC 13818-1 transport stream. The procedure is summarized as follows:

MPEG-4 content associated with a program carried in the transport stream shall be referenced in the Program Map Table of that program. Program Map Table is shown in Table 1.

An initial object descriptor (IOD) shall be used to define the ISO/IEC 14496-1 scene. The initial object descriptor, which serves as the initial access point to all associated MPEG-4 streams, shall be conveyed in the IOD descriptor located in the descriptor loop immediately following the program_info_length field in the Program Map Table of the program to which the scene is associated.

The IOD contains ES_Descriptors identifying the scene description and object descriptor streams that form the program. It may also contain ES_Descriptors identifying one or more associated IPMP or OCI streams, for example.

Elements of ISO/IEC 14496 content may be conveyed in one or more ISO/IEC 13818-1 MPEG-2 program elements referenced by a unique PID value within a Transport Stream. Carriage of ISO/IEC 14496 content in a PID is signaled by a stream_type value of 0×12 or 0×13 in the Program Map Table in association with that PID value.

The SL descriptor and the FMC descriptor shall be used to specify the ES_ID for each encapsulated ISO/IEC 14496 stream.

TABLE 1

Transport Stream program map section

| Syntax | No. of bits | Mnemonic |
|---|---|---|
| TS_program_map_section( ) { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i = 0; i < N; i++) { | | |
|     descriptor( ) | | |
|   } | | |
|   for (i = 0; i < N1; i++) { | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     for (i = 0; I < N2; i++) { | | |
|       descriptor( ) | | |
|     } | | |
|   } | | |

TABLE 1-continued

Transport Stream program map section

| Syntax | No. of bits | Mnemonic |
|---|---|---|
| CRC_32 | 32 | rpchof |
| } | | |

Figure 1:
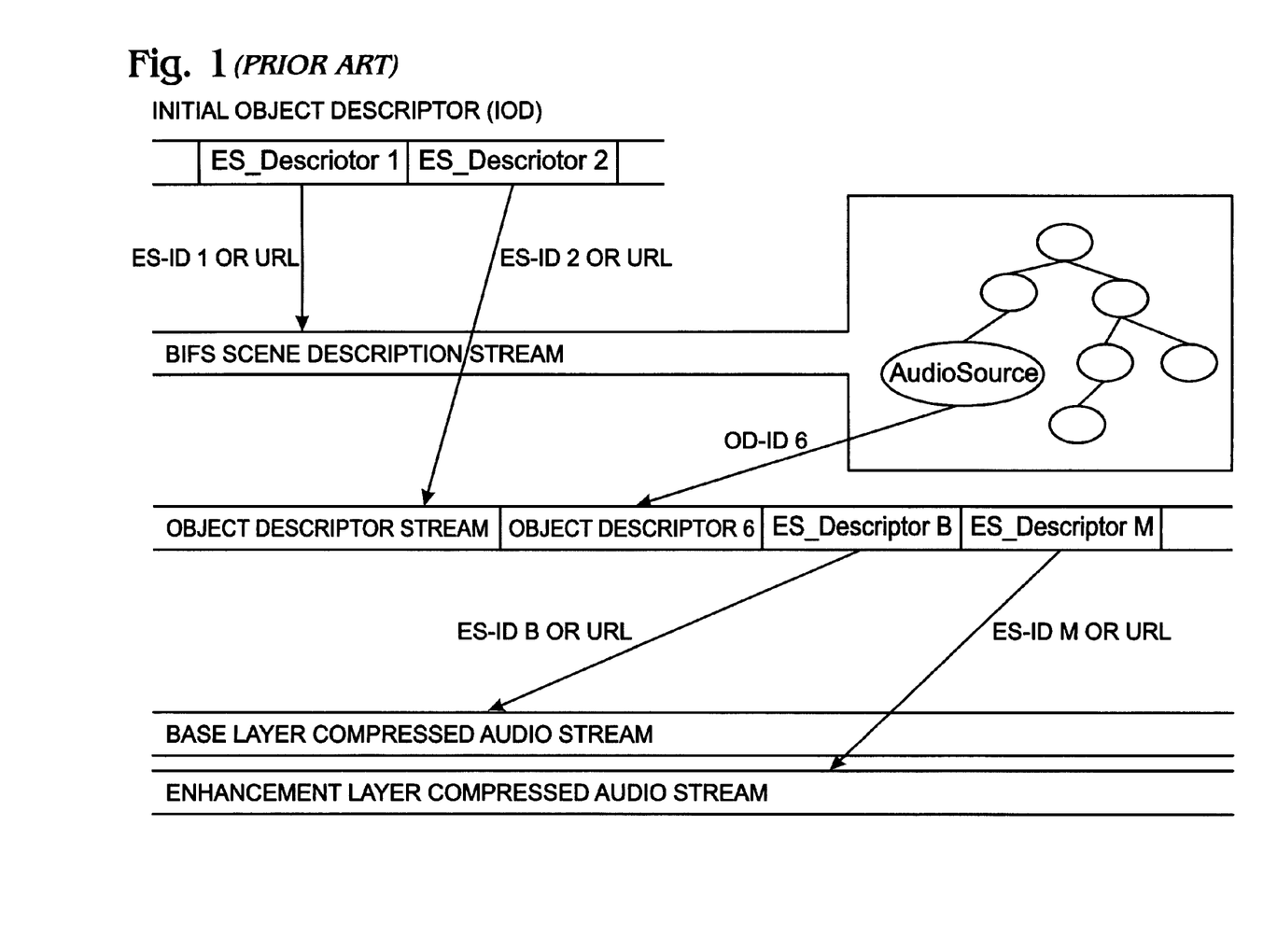
FIG. 1 is a diagram illustrating procedures for playing MPEG-4 content (prior art).

FIG. 1 is a diagram illustrating procedures for playing MPEG-4 content (prior art). Following the specification of ISO/IEC 13818-1, the procedures for playing MPEG-4 content received from a 13818-1 transport, as described above, is described as follows:

1. Obtain the initial object descriptor (IOD), which contains the ES_Descriptors for the BIFS scene stream; object descriptor streams, etc.
2. The BIFS ES_Descriptor contains the ES_ID and an optional Universal Resource Locator (URL) for the BIFS stream to retrieve. Accordingly, there are two ways to retrieve the BIFS streams:
   a. Use the ES_ID, which serves as a unique label for the elementary stream within its name scope, and the SL_Descriptor, which contains the PID for the ES_ID. The BIFS stream can be retrieved from the packets associated with the PID.
   b. Alternatively, if the ES_Descriptor contains an URL, the BIFS stream can be retrieved from the location specified by the URL. The retrieved stream is then associated with the ES_ID.
3. Repeat Step 2 for the object descriptor stream.
4. Compose the BIFS scene using the retrieved BIFS stream.
5. Some BIFS nodes are associated to the corresponding elementary streams resources via object descriptors. The association is established by means of the objectDescriptorID in the object descriptor.
   a. Use the objectDescriptorID to locate the object descriptor in the object descriptor stream.
   b. The object descriptor shall contain the ES_Descriptor for the elementary stream.

Repeat Step 2, i.e. use the ES_ID or URL, to retrieve the elementary stream.

Due to the complexity of the specified ISO/IEC methodology, there is not yet a valid and complete implementation available up to date, especially for the carriage of MPEG-4 Systems on the MPEG-2 transport. Thus, there is a need to define a new method for delivery of MPEG-4 content based upon MPEG-2 transport protocols.

It would be advantageous if a means could be developed for carrying MPEG-4 data in an MPEG-2 TS using existing ATSC MPEG-2 methodologies.

SUMMARY OF THE INVENTION

The present invention defines a new method for the carriage of MPEG-4 data in an ATSC MPEG-2 TS, using a uniform reference identifier (URI) and a transport stream file system (TSFS). TSFS is similar to the Object Carousel (OC), one of the important transports used in MPEG-2 broadcasting. While a uniform reference locator (URL) reference is defined in the ISO/IEC 13818-1 specification as an alternative approach for transmitting MPEG-4 data, no specific means for using an URL is defined in the specification. This invention defines the means and provides a solution fully compliant with the ISO/IEC 13818-1 standard. The solution is flexible and effective in downloading and associating the MPEG-4 components in a MPEG-2 broadcasting infrastructure. Furthermore, the original ISO/IEC method and the newly invented method can be used simultaneously. The receiver can also choose to cache the downloaded data to speed up the acquisition process and improve the reuse of data. In a summary, the present invention harmonizes the MPEG-2 and MPEG-4 standards, enabling an approach to carry MPEG-4 data, including scenes and associated streams, using the ATSC MPEG-2 TSFS transport protocol.

Accordingly, a URI pointer method is provided for the referencing of MPEG-4 data resources carried in an American ATSC MPEG-2 TSFS. The method comprises: receiving an MPEG-2 TS, with a packetized ATSC TSFS; locating a URI in the TS; in response to the URI, accessing an address such as a local identifier (lid) or an http address; in response to accessing the address, retrieving MPEG-4 resources from the ATSC TSFS; and, decoding the MPEG-4 resources.

Accessed lid URIs provide a binding name and access scheme to the objects in the ATSC TSFS, as a lid URI embedded in an Initial Object Descriptor (IOD) is used to locate resources in the TSFS such as a BIFS scene description stream and/or an object descriptor stream. Receiving an MPEG-2 TS, with a packetized ATSC TSFS, means that MPEG-4 resources are formed in a hierarchical directory structure of BIOP objects including a DSM::ServiceGateway, a DSM::Directory, and a DSM::File.

The retrieved MPEG-4 resources can be audio, video, and/or systems data. Further, the method can be used to access MPEG-4 audio/video stream data, if MPEG-4 audio/video stream is embedded in the MPEG-2 TS in accordance with ISO/IEC 13818-1 encapsulation standards. Then, the method further comprises retrieving the MPEG-4 audio/visual stream from the MPEG-2 TS, using MPEG-2 techniques and decoding the resource retrieved from the ATSC TSFS, together with the retrieved MPEG-4 audio/visual stream.

Additional details of the above-described method, and a receiver and broadcaster using a URI pointer system for accessing pointers to MPEG-4 data in an ATSC MPEG-2 TSFS are provided below.

DETAILED DESCRIPTION OF THE PREFERRED EMBODIMENTS

Figure 2:
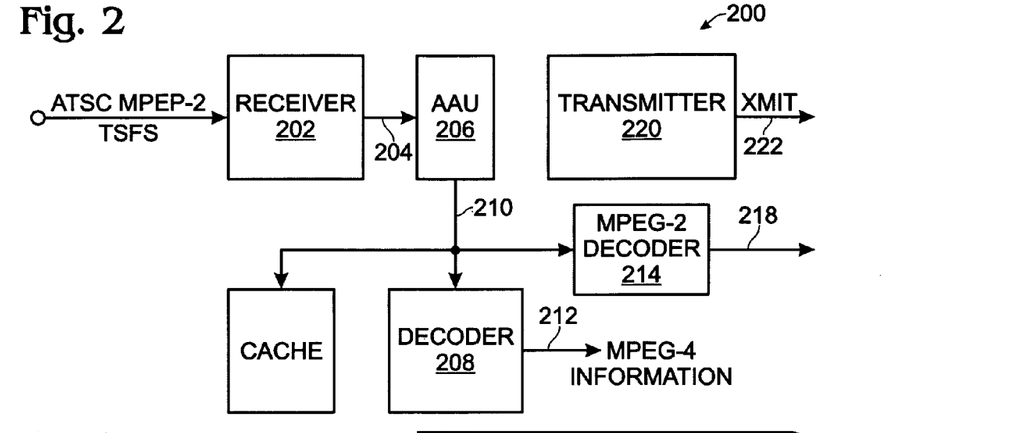
FIG. 2 is a schematic block diagram of the present invention uniform resource identifier (URI) pointer system for accessing MPEG-4 data from an American Advanced Television Systems Committee (ATSC) MPEG-2 transport stream file system (TSFS).

FIG. 2 is a schematic block diagram of the present invention uniform resource identifier (URI) pointer system for accessing MPEG-4 data from an American Advanced Television Systems Committer (ATSC) MPEG-2 transport stream file system (TSFS). The system 200 comprises a receiver 202 having an interface on line 204 for accepting an MPEG-2 TS with an embedded URI, as well as a packetized ATSC TSFS. Note, that although the drawing implies a single TS, multiple TSs may be received. Also note that the URI is typically not embedded in the ATSC TSFS. An address access unit 206 has an interface on line 204 to accept the MPEG-2 TS from the receiver 202. The address access unit 206 (AAU) locates a URI in the TS, accesses an address, and retrieves MPEG-4 resources from the ATSC TSFS. A decoder 208 has an interface connected to the address access unit 206 on line 210 for receiving the MPEG-4 resources and an interface on line 212 for supplying the decoded MPEG-4 information.

In the context of this invention, the address access unit 206 locates a URI such as an http address or a local identifier (lid). Typically, lid addresses are accessed. However, it is possible to use an http address as a lid. That is, an http can be used to access a file in the TSFS, if the file is indexed with an http address. One advantage of using an http address as a lid address, is that the system 200 may choose to access a website for example, as a backup if, for some reason, the ATFS TSFS is not available or convenient.

When the URIs are formed, they are embedded into an MPEG-2 TS. These formed URIs are used to construct the MPEG-4 system. An MPEG-4 system may also include an interactive scene with all kinds of pointers, such as URIs, to various audio/video/graphic objects (resources). The URI can reference resources (audio, video, system data) already in the cache, embedded in the broadcast transport using ATSC TSFS, or located at a remote site.

A codec system usually includes the system data, video, and audio resources. In MPEG-4, the systems data part is used to build up an interactive audiovisual scene. The scene consists of many objects (of different shapes) such as audio, video, graphics, html, etc. An example is a house scene consisting of a sofa object, chair objects, and table object. An MPEG-4 system is needed even if the scene includes only 1 object, as the MPEG-4 system is used to build an interactive scene.

Figure 3:
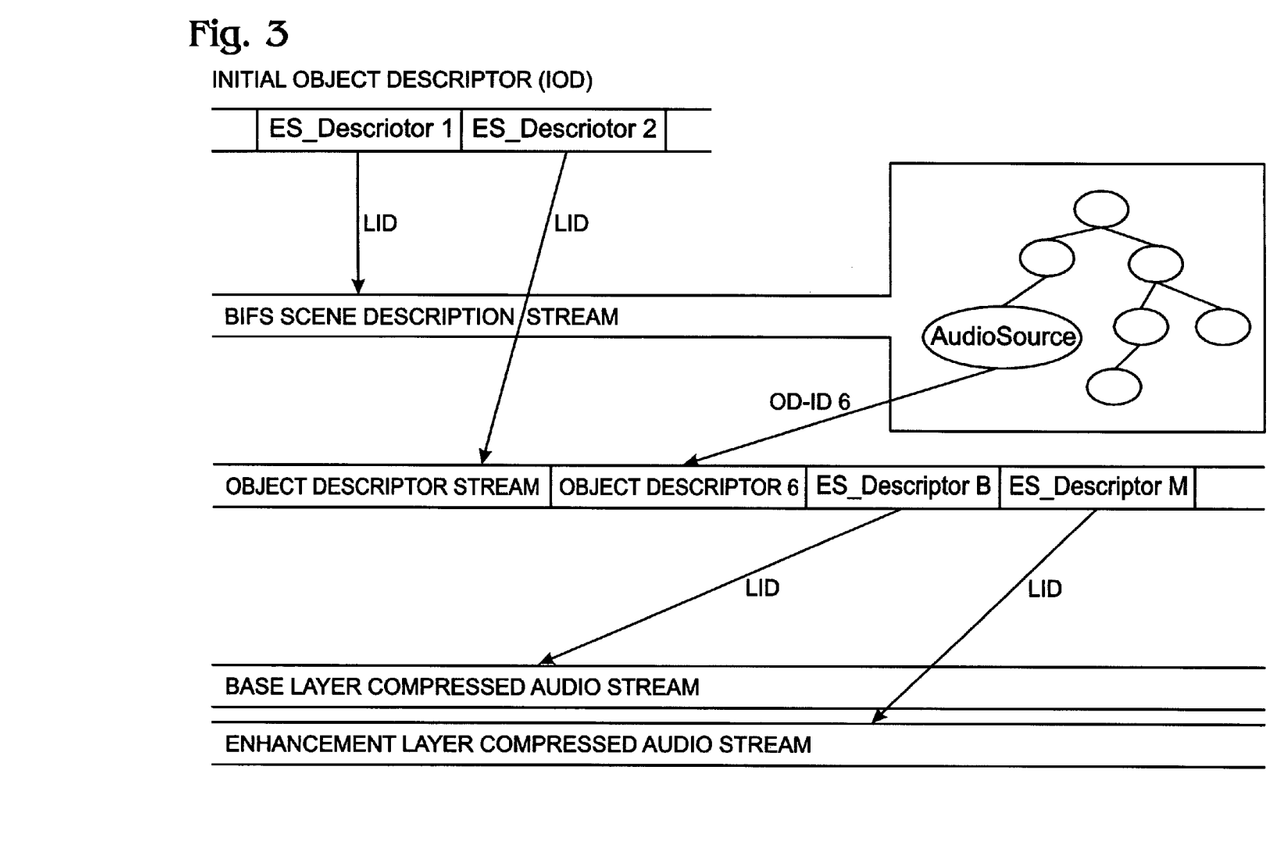
FIG. 3 is a diagram depicting a procedure for accessing MPEG-4 resources using lid URIs.

FIG. 3 is a diagram depicting a procedure for accessing MPEG-4 resources using lid URIs. The lid URI provides a binding name and access scheme to objects in the ATSC TSFS. More specifically, the address access unit uses a lid URI embedded in an Initial Object Descriptor (IOD) to locate resources in the ATSC TSFS. A BIFS scene description stream and an object descriptor stream are shown being accessed.

Figure 4:
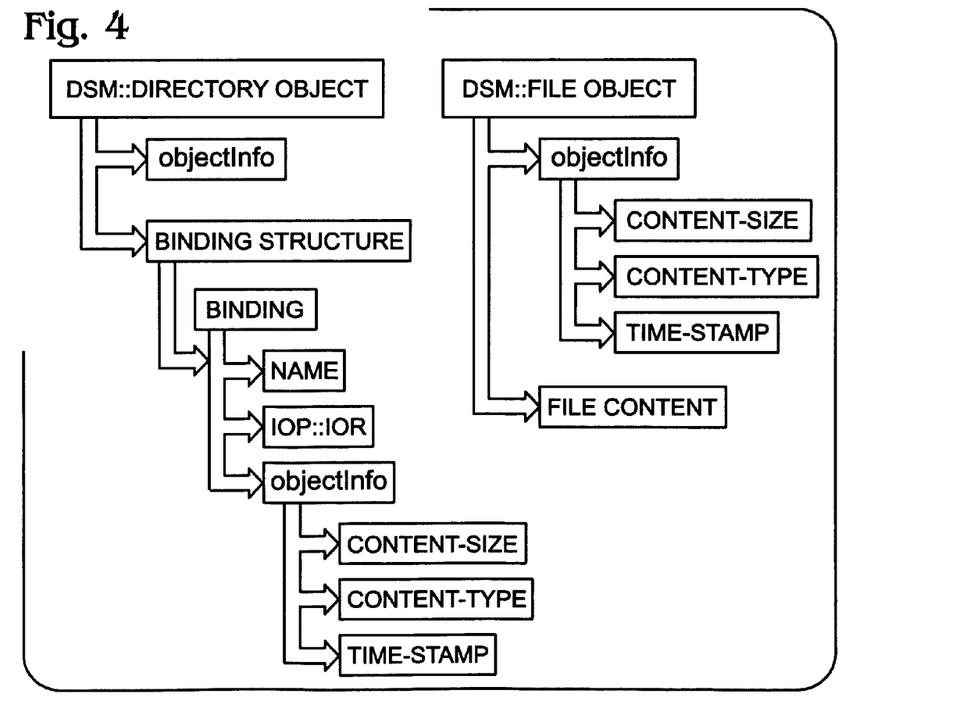
FIG. 4 is a diagram depicting the BIOP Directory and File Objects.

FIG. 4 is a diagram depicting the BIOP Directory and File Objects. As can be seen from the figure, the address access unit accesses MPEG-4 resources in a hierarchical directory of broadcast Inter-Object Request Broker Protocol (BIOP) objects including a DSM::ServiceGateway, a DSM::Directory, and a DSM::File.

Figure 5:
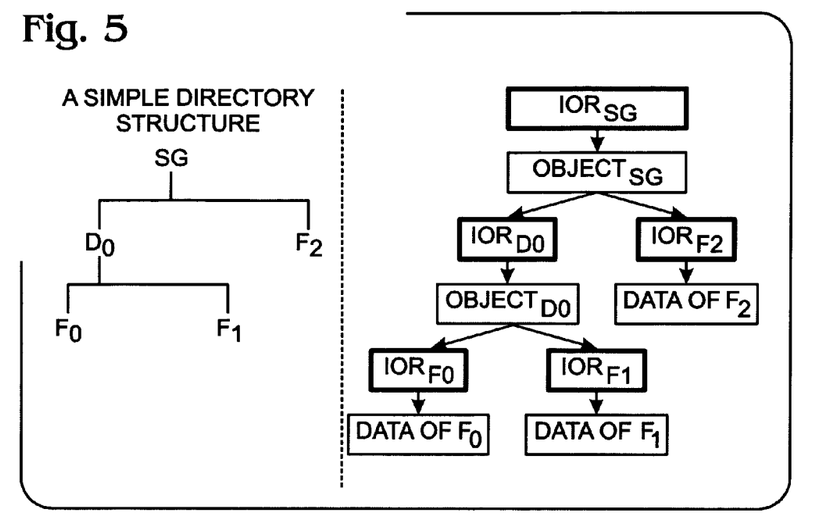
FIG. 5 is a diagram illustrating a simple ATSC TSFS file structure.

FIG. 5 is a diagram illustrating a simple ATSC TSFS file structure. It should be noted that SG is Service Directory, D is Directory, and F stands for file. The address access unit retrieves MPEG-4 resources from the ATSC TSFS as follows. First, a DSI message is located. DSI stands for Download-ServerInitiate( ). It is a message used by TSFS (and DSMCC OC) to broadcast the IOR (a kind of pointer) of the Service Gateway (the root directory of the file system). Then, the interoperable object reference (IOR) for the Service Gateway is extracted. When the IOR of the SG is extracted from the DSI, the SG can be located and retrieved. The Service Gateway object is parsed, and IORs for Directory and File objects are extracted from the Service Gateway binding structure. Finally, MPEG-4 resources are acquired from the file objects.

Figure 6:
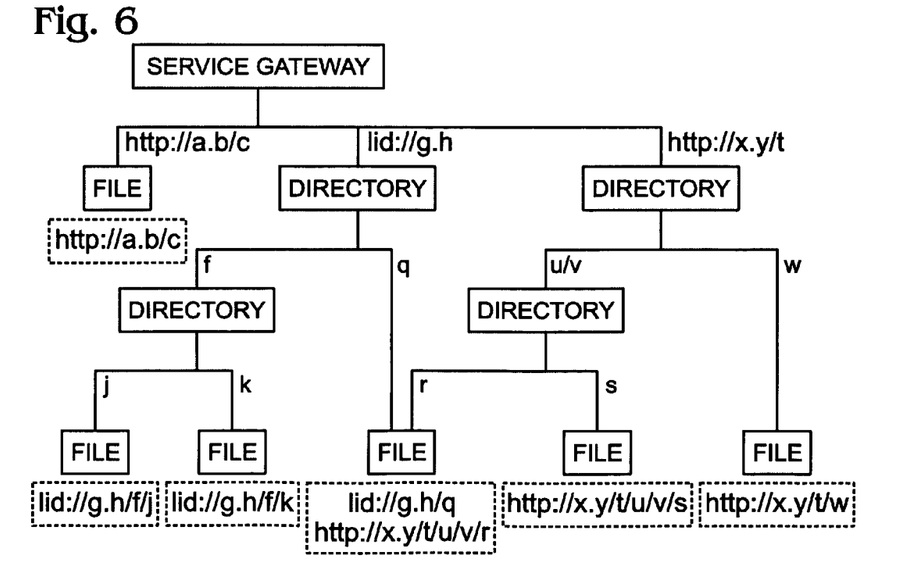
FIG. 6 is a diagram depicting an exemplary TSFS file directory.

FIG. 6 is a diagram depicting an exemplary TSFS file directory.

Returning to FIG. 2, the address access unit 206 retrieves MPEG-4 resources form the ATSC TSFS that include audio, video, and systems data. These resources permit the decoder 208 to supply MPEG-4 information such as enhanced audio data in the MPEG-2 TS and/or enhanced video data in the MPEG-2 TS. The systems data can be used to establish an interactive audiovisual scene and communication link. However, steam data cannot be carried in the ATSC TSFS. In some aspects of the system, the receiver 202 additionally receives an MPEG-4 audio/video stream embedded in the MPEG-2 TS in accordance with ISO/IEC 13818-1 encapsulation standards. Then, the address access unit 206 supplies the audio/visual stream retrieved from the MPEG-2 TS. An MPEG-2 decoder 214 has an interface on line 210 to accept the retrieved MPEG-4 audio/visual stream and an interface on line 218 to supply decoded MPEG-4 audio/visual stream information in accordance with ISO/IEC 13818-1 encapsulation methods for the carriage of MPEG-4 streams in an MPEG-2 TS.

It should be understood that the URI and MPEG-4 resources need not necessarily be carried in the same TS. In some aspects, the receiver 202 receives a first MPEG-2 TS and a second MPEG-2 TS with a packetized ATSC TSFS. The address access unit 206 retrieves the lid URI from the first MPEG-2 TS, and retrieves MPEG-4 resources from the ATSC TSTS in the second MPEG-2 TS. It should also be understood that the first and second TSs need not be received simultaneously. In other aspects, both TSs carry packetized ATSC TSFSs with embedded MPEG-4 resources. Then, URIs in the first TS can be used to retrieve MPEG-4 resources in both the first and second TSs.

In other aspects, the system 200 further comprises a transmitter 220 having a transmit interface on line 222. The transmitter 220 and receiver 202 can be used to form an interactive audiovisual scene and communication link in response to decoding MPEG-4 systems data.

In one aspect, the system further comprises a local cache 224 have an interface on line 210 to receive retrieved MPEG-4 resources from storage. These resources can be accessed using URIs in subsequently received TSs, or subsequently received URIs in the same TS. For example, the address access unit 206 may access a local cache address or a Web protocol identifier, instead of, or in addition to, the lid address. Then, MPEG-4 resources can be retrieved from the local cache 224 in response to accessing the local cache address. Processing resources can be conserved if the AAU 206 does not have to build the entire directory every time new ATSC TSFS data is received in a TS. Alternately, a Web protocol identifier or http address can be used to access MPEG-4 resources from a network-connected website.

Figure 7:
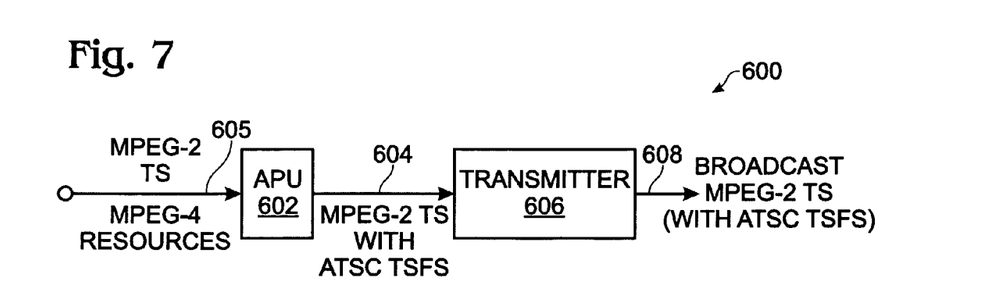
FIG. 7 is a schematic block diagram of the present invention URI pointer system for accessing MPEG-4 data in an American ATSC MPEG-2 TSFS in an MPEG-4 broadcaster.

FIG. 7 is a schematic block diagram of the present invention URI pointer system for accessing MPEG-4 data in an American ATSC MPEG-2 TSFS in an MPEG-4 broadcaster. The system 600 comprises an address pointer unit (APU) 602 having an interface on line 604 to supply an MPEG-2 TS with URIs for accessing MPEG-4 resources embedded in an ATSC TSFS, and to supply a MPEG-2 TS with the packetized ATSC TSFS. The APU 602 receives an encoded MPEG-2 TS and MPEG-4 resources on line 605. In some aspects, the same TS carries both the URIs and ATSC TSFS. A transmitter 606 has an interface on line 604 to accept the MPEG-2 TS, with the packetized ATSC TSFS from the address pointer unit 602. The transmitter 606 has an interface on line 608 to broadcast the MPEG-2 TS.

The APU 602 supplies an MPEG-2 TS with either an http address or a lid URI. As mentioned above, in some aspects the http address can be used as a lid to access MPEG-4 resources in the ATSC TSFS (if the resource file is labeled appropriately). Thus, the APU 602 generates a lid URI to supply a binding name and access scheme to objects in the ATSC TSFS. That is, the APU 602 generates a lid URI embedded in an Initial Object Descriptor (IOD) to locate either BIFS scene description stream and/or object descriptor stream resources in the ATSC TSFS (see FIG. 3).

The APU 602 embeds MPEG-4 resources in an ATSC TSFS by forming the MPEG-4 resources in a hierarchical directory structure of BIOP objects including a DSM::ServiceGateway, a DSM::Directory, and a DSM::File (see FIG. 4). The APU 602 embeds MPEG-4 resources in the ATSC TSFS as follows: MPEG-4 resources are loaded into File objects; IORs for Directory and File Objects are created; the IORs are bound in a Service Gateway; an IOR is created for the Service Gateway; and, the Service Gateway IOR is located in a DSI message (see FIG. 5).

Typically, the APU 602 embeds MPEG-4 resources in an ATSC TSFS such as audio, video, and systems data. When stream data is to be broadcast, the APU 602 additionally embeds an MPEG-4 audio/video stream in the MPEG-2 TS in accordance with ISO/IEC 13818-1 encapsulation standards. The transmitter 608 broadcasts the MPEG-2 TS with the embedded MPEG-4 audio/video stream.

In some aspects, the APU 602 locates a lid URI in a first MPEG-2 TS and embeds MPEG-4 resources in an ATSC TSFS packetized in a second MPEG-2 TS. Then, the transmitter 608 broadcasts the first and second MPEG-2 TSs. As noted above, the transmitter 608 need not necessarily broadcast the first and second TSs simultaneously. Further, the URIs in the first TSs may point to resources in more than one TS (with packetized ATSC TSFSs).

In another aspect, the APU 602 generates additional URI addresses embedded in the MPEG-2 TS, such as http and local (receiver) cache addresses, for accessing MPEG-4 resources from a website and a local (receiver) cache, respectively.

Functional Description

Returning to FIG. 3, although not shown, it should be noted that object descriptor can have a URL pointing to another object descriptor, elsewhere. The new object descriptor is referenced and associated with the objectDescriptorID of the original object descriptor carrying the URL string. The technique is applicable to both elementary stream and object descriptors. An elementary stream is used an example in the following discussion. However, the same analysis applies equally well to the object descriptors. As explained above, two approaches have been advanced for retrieving elementary streams: (1) via the ES_ID and the associated PID for the packets carried in the transport; and, (2) the present invention process of using URLs to reference streams carried elsewhere, such as over an IP network. However, the URL means is undefined in the ISO/IEC 13818-1 specification. The present invention defines the URL reference means, for accessing resources in a broadcast file system, over the Internet, and in local memory.

URI, URL and Local Identifier (lid:) URI Scheme

Universal Resource Identifier (URI) document (RFC2396) defines a simple, unified and extensible mechanism for identifying a resource. URIs are a URL superset, and they are not limited to existing Internet protocols. The present invention uses the lid scheme for URI reference. The lid scheme, as defined in SMPTE 343M-2002, was originally designed to identify resources, such as HTML pages and graphics files, that are transmitted through unidirectional means, such as a television broadcast. Using the lid scheme in a broadcast transport, there is no need for a return channel to access resources (MPEG-4 scenes and associated streams) over the Internet. It is easier for a receiver to associate the related program elements in a timely fashion. More specifically, the present invention uses the lid scheme with ATSC TSFS broadcast system.

ATSC TSFS

First, MPEG-4 resources must be organized in a broadcast transport, with a unique URI for each resource. The ATSC Transport Stream File System (TSFS) provides such a means. Specifically, ATSC TSFS provides a file system in a transport so that the URI scheme can reference specific resources. TSFS is based upon the Object Carousel protocols defined in ISO/IEC13818-6 DSM-CC.

TSFS use the following types of BIOP objects: DSM::ServiceGateway, DSM::Directory, and DSM::File, which are shown in FIG. 4. Each BIOP object has its unique object key and type information (directory, file or service gateway) in the header. It also has an additional objectInfo structure giving information such as file size, content-type (MIME type), time stamp, etc, depending on the type of the BIOP object. The body of a DSM::File object is the file content. The body of a DSM::ServiceGateway or DSM::Directory object consists of a list of bindings. A binding contains a binding name, the object type of the referenced object (directory, file, or service gateway), and an IOP::IOR (Interoperable Object Reference), which gives the location of the referenced object. IOP::IOR is often just called an IOR.

A DSM::ServiceGateway object is similar to a DSM::Directory object. The difference between these two objects is simply in the syntax of the binding name. For a DSM::ServiceGateway object, a name is always a base URI; while for a DSM::Directory object, a name is a relative path. Each TSFS has exactly one Service Gateway object that serves as the top-level directory of the TSFS. Objects in the TSFS can be reached by following a directory path, i.e. a sequence of directory links, starting from the Service Gateway. An object in a TSFS may be referenced from multiple directories, so there may be multiple paths from the Service Gateway to an object.

FIG. 5 gives an example of the sequence for acquiring all the objects in a TSFS with a simple hierarchical directory structure. First, the IOR of the Service Gateway object is extracted from the DSI message. Given the IOR for the Service Gateway, the Service Gateway object can be parsed from the data module carrying it. From the binding structure inside the Service Gateway object, the IORs for Directory object D0 and File object F2 can be extracted. Given the IOR for F2, the file data for F2 can be acquired from the data module carrying the F2 object. Given the IOR for D0, Directory object D0 can be extracted, from which the IORs for F0 and F1 can be obtained. Similarly, given the IOR for F0 and the IOR for F1, the file data for F0 and F1 can be acquired. Thus, the IORs for objects in the directory structure are acquired in the following sequence: IOR-SG, IOR-D0, IOR-F2, IOR-F0 and IOR-F1. Once an IOR of an object is obtained, the object can then be retrieved from the corresponding data module.

Note that objects of a TSFS are usually carried in a single virtual channel. However, it is possible to have bindings that contain references to objects in other TSFSs (often called "soft links"). These other TSFSs may be in the same or a different virtual channel. When the TSFS resides in a different virtual channel, it may, or may not be in the same transport stream. Thus, the logical name space of a TSFS may span multiple virtual channels and even multiple transport streams. An IOP::IOR, which references an object in a different TSFS, should identify the TSFS containing the object and give the directory path in that TSFS that leads from the Service Gateway of that TSFS to the object.

Caching of ATSC TSFS

The receiver may also choose to cache all, or part the directory and file objects in its local storage, and set up URI indexes to the objects. Then, the acquisition of any object can be achieved very quickly from the local memory, without going through the TSFS in the broadcasting transport. URI may also reference the resources in the local file systems, which are not originated from the downloaded TSFS.

Integrated Lid URI Scheme and ATSC TSFS

The lid URI scheme can be used to access the resources in the broadcast transport or in the memory of a receiver. The ATSC TSFS is used to provide a unique URI for each resource being transmitted. Thus, both the reference and carriage MPEG-4 program elements in an organized file system of a MPEG-2 transport can be accomplished. The following possibilities exist:

Resources (MPEG-4 scenes and associated streams) may be carried in the same TSFS. Conventionally, stream type resources are not supported by TSFS. However, it is possible to carry a short stream as a file in the MPEG-4 systems data. Large, continuous streams cannot be contained in a relatively small systems data file;

Resources in a different TSFS can be carried in the same virtual channel;

Resources in a TSFS of a different virtual channel may, or may not be carried in the same transport stream;

Resources can be stored in local cache.

Other URI Schemes in the TSFS

Even though this invention predominantly uses the lid scheme to reference resources in a broadcasting transport, a URI scheme can also be used to access http addresses. Like the DCM-CC object carousel, to which the ATSC TSFS is related, only the binding name of a DSM::ServiceGateway object is required as a base (absolute) URI. The base URI can be either a lid or an http, although other types of addresses are possible. However, there is some difference in the use and resolution of the different URI schemes. A lid URI "should" be used to label a broadcast resource when it is available only in the broadcast stream. An http URI "should" be used to label a broadcast resource when it is also available on a web server. If http URIs are used, a receiver with limited cache space and an Internet connection has the option of caching resources labeled with a lid URI, and not cache resources labeled with an http URI.

When resolving a lid reference, the receiver may first look for the resource in cache. If it is not found, it can just report that the resource is not available, or it can wait for the resource to appear in the broadcast stream. The receiver can time out and report that the resource is not available if the resource does not appear after some period of time.

When resolving an http URI reference, a receiver may first look for the resource in cache. If it is not found, and if the receiver has an Internet connection, it can simultaneously look for the resource on the Internet and watch for it to appear in the broadcast stream. If the receiver cannot find the resource in either place, after some period of time it can time out and report the resource as not available.

Figure 8:
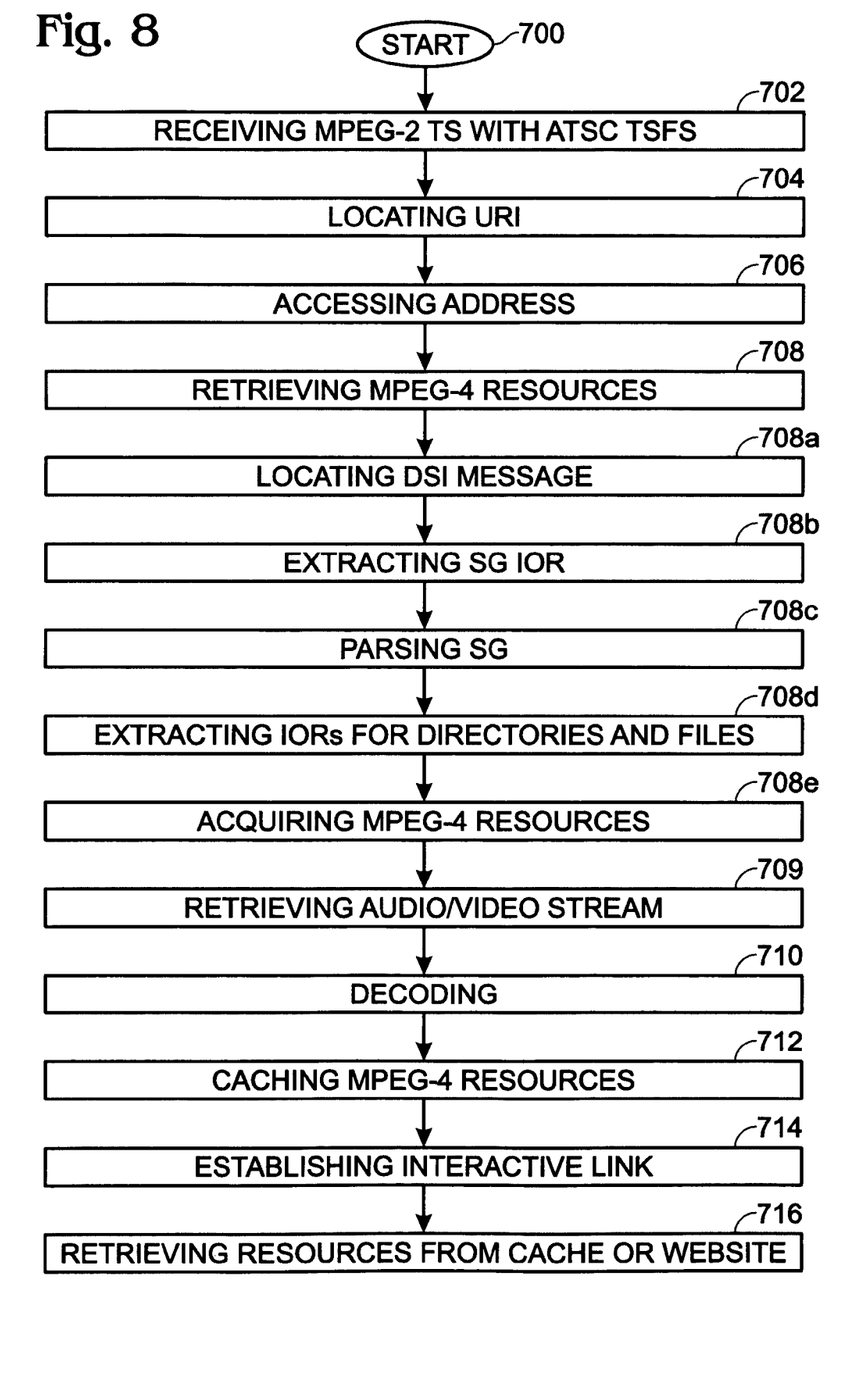
FIG. 8 is a flowchart illustrating the present invention URI pointer method for the referencing of MPEG-4 data resources carried in an American ATSC MPEG-2 TSFS.

FIG. 8 is a flowchart illustrating the present invention URI pointer method for the referencing of MPEG-4 data resources carried in an American ATSC MPEG-2 TSFS. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 700.

Step 702 receives an MPEG-2 TS, with a packetized ATSC TSFS. Step 704 locates a URI in the TS. Step 706, in response to the URI, accesses an address. Typically, accessing an address in Step 706 includes accessing a local identifier (lid) and/or an http address. Step 708 retrieves MPEG-4 resources from the ATSC TSFS in response to accessing the address. Step 710 decodes the MPEG-4 resources. In one aspect, Step 712 caches the retrieved MPEG-4 resources.

In some aspects of the method, accessing an address in Step 706 includes accessing a lid URI that provides a binding name and access scheme to the objects in the ATSC TSFS. More specifically, a lid URI embedded in an Initial Object Descriptor (IOD) is used to locate resources in the TSFS such as a BIFS scene description stream and/or an object descriptor stream.

Receiving an MPEG-2 TS, with a packetized ATSC TSFS, in Step 702 includes forming MPEG-4 resources in a hierarchical directory structure. That is, a hierarchical directory structure is formed of BIOP objects including a DSM::ServiceGateway, a DSM::Directory, and a DSM::File.

In some aspects, retrieving MPEG-4 resources from the ATSC TSFS, in Step 708, includes substeps. Step 708*a* locates a DSI message. Step 708*b* extracts the IOR for the Service Gateway. Step 708*c* parses the Service Gateway object. Step 708*d* extracts IORs for Directory and File objects from the Service Gateway binding structure. Step 708*e* acquires MPEG-4 resources from the file objects.

Typically, retrieving MPEG-4 resources from ATSC TSFS in Step 708 includes retrieving MPEG-4 resources selected from the group including audio, video, and systems data. Then, decoding the MPEG-4 resources in Step 710 includes an action such as enhancing audio data in the MPEG-2 TS, enhancing video data in the MPEG-2 TS, or using the systems data to establish an interactive audiovisual scene and communication link. In some aspects a further step, Step 714, establishes an interactive audiovisual scene and communication link in response to decoding MPEG-4 systems data.

To receive stream data, Step 702 additionally receives an MPEG-4 audio/video stream embedded in the MPEG-2 TS in accordance with ISO/IEC 13818-1 encapsulation standards. Then, the method further comprises a Step 709 of retrieving the MPEG-4 audio/visual stream from the MPEG-2 TS. In this case, decoding the MPEG-4 resources in Step 710 includes decoding the resource retrieved from the ATSC TSFS, together with the retrieved MPEG-4 audio/visual stream.

In some aspects, receiving an MPEG-2 TS, with a packetized ATSC TSFS, in Step 702 includes receiving a first MPEG-2 TS and a second MPEG-2 TS with a packetized ATSC TSFS. Then, locating a URI in the TS in Step 704 includes retrieving a lid URI in the first MPEG-2 TS, and retrieving MPEG-4 resources from the ATSC TSFS in Step 708 includes retrieving MPEG-4 resources from the second MPEG-2 TS ATSC TSFS.

In one aspect, accessing an address in response to the URI in Step 704 includes additionally accessing an address such as a local cache address and/or a Web protocol identifier. Then, a further step, Step 716, retrieves MPEG-4 resources, in response to accessing the address, from a source selected from the group including a local cache and/or a website.

Figure 9:
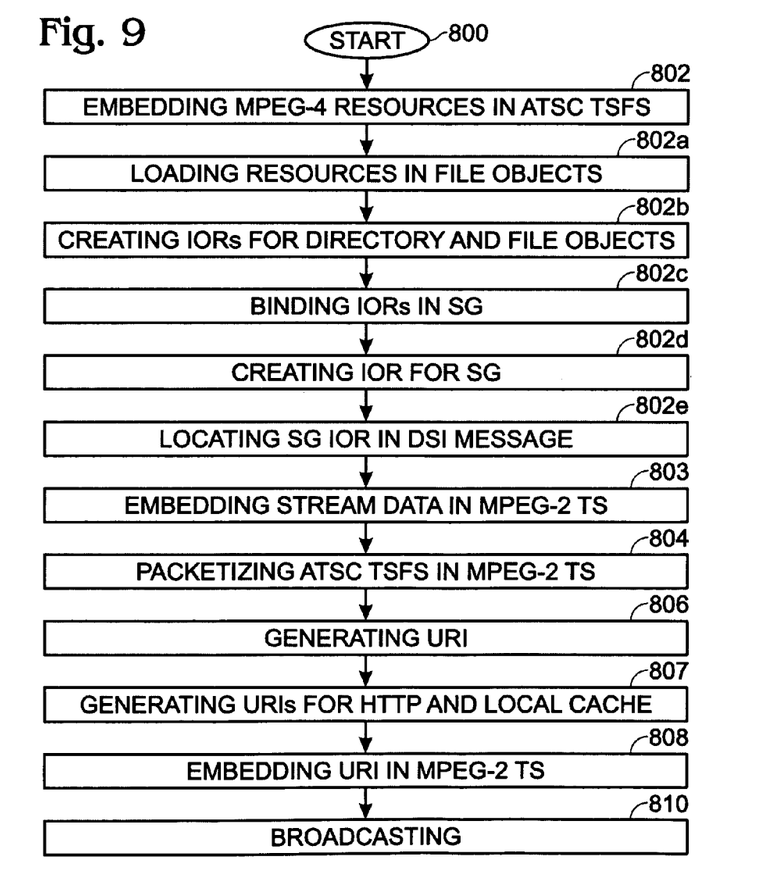
FIG. 9 is a flowchart illustrating the present invention URI pointer method for broadcasting pointers to MPEG-4 data in an American ATSC MPEG-2 TSFS.

FIG. 9 is a flowchart illustrating the present invention URI pointer method for broadcasting pointers to MPEG-4 data in an American ATSC MPEG-2 TSFS. The method begins at Step 800. Step 802 embeds MPEG-4 resources in an ATSC TSFS. Step 804 packetizes the ATSC TSFS in an MPEG-2 TS. Step 806 generates a URI for accessing MPEG-4 resources located at an address in the ATSC TSFS. Step 808 embeds the URI in an MPEG-2 TS. Step 810 broadcasts the MPEG-2 TS, with the packetized ATSC TSFS.

Typically, Step 806 generates a URI such as an http address and/or a local identifier (lid). In one aspect, a further step, Step 807, generates additional URI addresses such as http and local (receiver) cache addresses for accessing MPEG-4 resources from a website and a local (receiver) cache, respectively.

In one example of Step 806, a lid URI can be generated to supply a binding name and access scheme to objects in the ATSC TSFS. Further, a generated lid URI may be embedded in an Initial Object Descriptor (IOD) to locate resources in the ATSC TSFS such as a BIFS scene description stream and/or an object descriptor stream.

Embedding MPEG-4 resources in an ATSC TSFS in Step 802 includes forming the MPEG-4 resources hierarchical directory structure of BIOP objects including a DSM::ServiceGateway, a DSM::Directory, and a DSM::File. In some aspects, Step 802 includes substeps. Step 802a loads the MPEG-4 resources into File objects. Step 802b creates IORs for Directory and File Objects. Step 802c binds the IORs in a Service Gateway. Step 802d creates an IOR for the Service Gateway. Step 802e locates the Service Gateway IOR in a DSI message.

In one aspect, embedding MPEG-4 resources in an ATSC TSFS (Step 802) includes embedding MPEG-4 resources such as audio, video, and/or systems data, that can be used for a purpose such as enhancing audio data in the MPEG-2 TS, enhancing video data in the MPEG-2 TS, and/or systems data for the establishment of an interactive audiovisual scene and communication link.

In other aspects, Step 803 embeds an MPEG-4 audio/video stream in the MPEG-2 TS in accordance with ISO/IEC 13818-1 encapsulation standards. Then, Step 810 broadcasts the MPEG-2 TS with the embedded MPEG-4 audio/video stream.

In other aspects, embedding the URI in an MPEG-2 TS in Step 808 includes locating a lid URI in a first MPEG-2 TS, and packetizing the ATSC TSFS in an MPEG-2 TS in Step 808 includes packetizing the MPEG-4 resources in an ATSC TSFS carried by a second MPEG-2 TS. Then, Step 810 broadcasts the first and second MPEG-2 TSs.

Systems and methods have been provided for using a URI, embedded in an MPEG-2 TS, to access MPEG-4 resources in an ATSC TSFS. A few examples have been given of how the URIs can be used, but these examples are not an exhaustive list. Likewise, examples have been given for MPEG-4 resource locations, but other locations are possible. Other variations and embodiments will occur to those skilled in the art.

I claim:

1. A uniform resource identifier (URI) pointer method for broadcasting pointers to Motion Picture Experts Group 4 (MPEG-4) data in an American advanced television systems committee (ATSC) Motion Picture Experts Group 2 (MPEG-2) transport stream file system (TSFS), the method comprising:

embedding hierarchical structure MPEG-4 resources in an ATSC TSFS;

packetizing the ATSC TSFS in an MPEG-2 TS;

generating a local identifier (lid) URI for accessing MPEG-4 resources located at an address in the ATSC TSFS, embedded in an Initial Object Descriptor (IOD) and providing a binding name and access scheme to objects in the ATSC TSFS to locate resources in the TSFS selected from a group consisting of Binary Format For Scenes (BIFS) description stream and an object descriptor stream;

embedding the URI in an MPEG-2 TS; and, broadcasting the MPEG-2 TS, with the packetized ATSC TSFS.

2. The method of claim 1 wherein forming a hierarchical directory structure includes forming a hierarchical directory structure of BIOP objects including a DSM::ServiceGateway, a DSM::Directory, and a DSM::File.

3. The method of claim 2 wherein embedding MPEG-4 resources in the ATSC TSFS includes:

loading the MPEG-4 resources into File objects;

creating IORs for Directory and File Objects;

binding the IORs in a Service Gateway;

creating an IOR for the Service Gateway; and, locating the Service Gateway IOR in a DSI message.

4. The method of claim 2 further comprising:

embedding an MPEG-4 audio/video stream in the MPEG-2 TS in accordance with ISO/IEC 13818-1 encapsulation standards; and, wherein broadcasting the MPEG-2 TS includes broadcasting the MPEG-2 TS with the embedded MPEG-4 audio/video stream.

5. The method of claim 1 wherein embedding the URI in an MPEG-2 TS includes locating a lid URI in a first MPEG-2 TS;

wherein packetizing the ATSC TSFS in an MPEG-2 TS includes packetizing the MPEG-4 resources in an ATSC TSFS carried by a second MPEG-2 TS; and, wherein broadcasting the MPEG-2 TS includes broadcasting the first and second MPEG-2 TSs.

6. The method of claim 1 wherein embedding MPEG-4 resources in an ATSC TSFS includes embedding MPEG-4 resources selected from the group including audio, video, and systems data.

7. The method of claim 6 wherein embedding MPEG-4 resources in an ATSC TSFS includes resources used for a purpose selected from the group including enhanced audio data in the MPEG-2 TS, enhanced video data in the MPEG-2 TS, and systems data for the establishment of an interactive audiovisual scene and communication link.

8. The method of claim 1 further comprising:

generating additional URI addresses selected from the group including http and local (receiver) cache addresses for accessing MPEG-4 resources from a website and a local (receiver) cache, respectively.

9. In an MPEG-4 broadcaster, a uniform resource identifier (URI) pointer system for accessing Motion Picture Experts Group 4 (MPEG-4) data in an American Advanced Television Systems Committer (ATSC) Motion Picture Experts Group 2 (MPEG-2) transport stream file system (TSFS), the system comprising:

an address pointer unit (APU) having an interface to supply an MPEG-2 TS with local identifier (lid) URIs for accessing hierarchical structure MPEG-4 resources embedded in an ATSC TSFS with an Initial Object Descriptor (IOD) providing a binding name and access scheme to objects in the ATSC TSFS to locate resources in the TSFS selected from a group consisting of Binary Format For Scenes (BIFS) description stream and an object descriptor stream, and to supply a MPEG-2 TS with the packetized ATSC TSFS; and, a transmitter having an interface to accept the MPEG-2 TS, with the packetized ATSC TSFS from the address pointer unit, and an interface to broadcast the MPEG-2 TS.

10. The system of claim 9 wherein the APU forms a hierarchical directory structure of BIOP objects including a DSM::ServiceGateway, a DSM::Directory, and a DSM::File.

11. The system of claim 10 wherein the APU embeds MPEG-4 resources in the ATSC TSFS as follows:
    loading the MPEG-4 resources into File objects;
    creating IORs for Directory and File Objects;
    binding the IORs in a Service Gateway;
    creating an IOR for the Service Gateway; and,
    locating the Service Gateway IOR in a DSI message.

12. The system of claim 10 wherein the APU additionally embeds an MPEG-4 audio/video stream in the MPEG-2 TS in accordance with ISO/IEC 13818-1 encapsulation standards; and,
    wherein the transmitter broadcasts the MPEG-2 TS with the embedded MPEG-4 audio/video stream.

13. The system of claim 9 wherein the APU locates a lid URI in a first MPEG-2 TS and embeds MPEG-4 resources in an ATSC TSFS packetized in a second MPEG-2 TS; and,
    wherein the transmitter broadcasts the first and second MPEG-2 TSs.

14. The system of claim 9 wherein the APU embeds MPEG-4 resources in an ATSC TSFS selected from the group including audio, video, and systems data.

15. The system of claim 9 wherein the APU generates additional URI addresses embedded in the MPEG-2 TS selected from including http and local (receiver) cache addresses for accessing MPEG-4 resources from a website and a local (receiver) cache, respectively.

* * * * *